United States Patent [19]
Bender et al.

[11] 3,768,881
[45] Oct. 30, 1973

[54] WHEEL BEARING SEAL

[75] Inventors: John R. Bender; Peter Brooks, both of South Bend, Ind.

[73] Assignee: The Bendix Corporation, South Bend, Ind.

[22] Filed: Oct. 2, 1972

[21] Appl. No.: 294,137

[52] U.S. Cl............ 308/187.2, 308/184 R, 308/212
[51] Int. Cl. ............................................. F16c 33/78
[58] Field of Search................ 308/26, 187.1, 187.2, 308/208, 210, 212, 213, 214, 184 R

[56] References Cited
UNITED STATES PATENTS

| | | | |
|---|---|---|---|
| 3,272,574 | 9/1966 | Tassone et al.................... | 308/187.2 |
| 3,097,022 | 7/1963 | Sernetz........................... | 308/184 R |
| 2,063,738 | 12/1936 | Hedgcock........................... | 308/214 |
| 2,573,735 | 11/1951 | Sanford et al................... | 308/187.1 |

*Primary Examiner*—Charles J. Myhre
*Assistant Examiner*—Barry Grossman
*Attorney*—Gordon H. Chenez et al.

[57] ABSTRACT

A grease retaining and/or dirt excluding seal for an annular bearing having annular inner (cone) and outer (cup) portions engageable with a rotatable wheel and fixed axle, respectively. The seal includes an annular metal plate having a flexible annular seal portion fixed thereto which slidably engages the fixed cone portion to establish a dynamic seal therewith. A plurality of spaced apart threaded studs fixedly secured at on end to the annular plate extend therefrom through a deformable annular member and annular backing ring into engagement with associated nuts which are tightened to compress the deformable annular member and extrude same into an adjacent annular depression formed in the wheel to thereby removably secure the annular plate position adjacent the cup portion. The annular plate is adapted to engage the cone portion to minimize relative axial movement between the cone and cup upon axial withdrawal of the wheel from the axle thereby maintaining the annular seal portion in sealing engagement with the cone portion.

6 Claims, 2 Drawing Figures

Patented Oct. 30, 1973  3,768,881

WHEEL BEARING SEAL

BACKGROUND OF THE INVENTION

It is a common practice to provide a grease retaining and/or dirt excluding seal for an annular bearing of the above-mentioned type. Reference is made to U. S. Pat. No. 3,362,452 issued Jan. 9, 1968 to E. E. Harnish (common assignee) for an example of an aircraft wheel and brake assembly embodying a typical prior art seal.

It has been found that a seal such as that shown in U.S. Pat. No. 3,362,452 is not entirely satisfactory for one or more reasons. It will be recognized that the grease cavity between the bearing and the seal is not completely sealed until the wheel is mounted on the axle since the dynamic seal portion of the seal depends upon engagement of the radial inner lip of the seal with the fixed axle. Removal of the wheel and attached bearing from the axle tends to expose the grease cavity to contamination by dust or dirt as well as possible loss of grease. Furthermore, removal of the wheel and attached bearing from the axle may result in damage to the seal by virtue of there being no retaining means carried by the wheel and engageable with the inner race or bearing cone for dislodging the inner race from the axle.

Another undesirable feature of the prior art seal shown in U.S. Pat. No. 3,362,452 is the requirement for a snap ring to secure the seal in position on the wheel. The snap ring mates with an annular groove in the wheel which groove tends to produce stress concentration at the base thereof and further acts as a corrosion trigger.

SUMMARY OF THE INVENTION

It is an object of the present invention to provide a grease retaining and/or dirt seal for an annular bearing for a wheel rotatably mounted on an axle wherein the sealing capability of the seal is equally effective upon removal of the wheel and attached bearing from the axle.

It is another object of the present invention to provide an annular grease retaining and/or dirt seal for an annular bearing for a wheel rotatably mounted on a fixed axle wherein the seal is secured to the wheel without the need for snap rings or the like.

It is an important object of the present invention to provide an annular grease retaining and/or dirt seal for an annular bearing having an outer race fixedly secured to a wheel and an inner race removably secured to an axle wherein the seal is fixedly secured in position relative to the outer race on the wheel and provided with a flange portion engageable with the inner race to facilitate removal of both races with the wheel from the axle.

BRIEF DESCRIPTION OF THE DRAWING

The drawing represents a conventional aircraft wheel, axle and bearing assembly embodying the present invention.

DESCRIPTION OF THE PREFERRED EMBODIMENT

Figure 1:
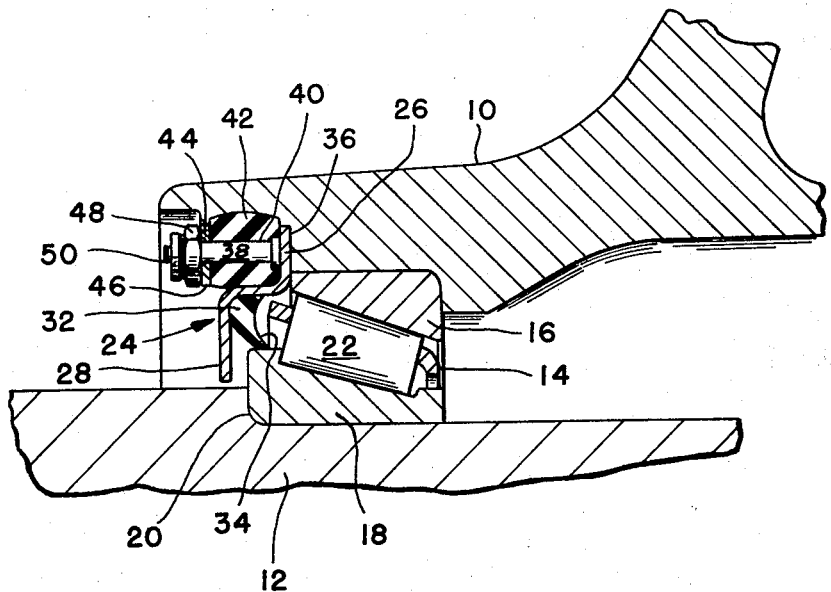
Figure 2:
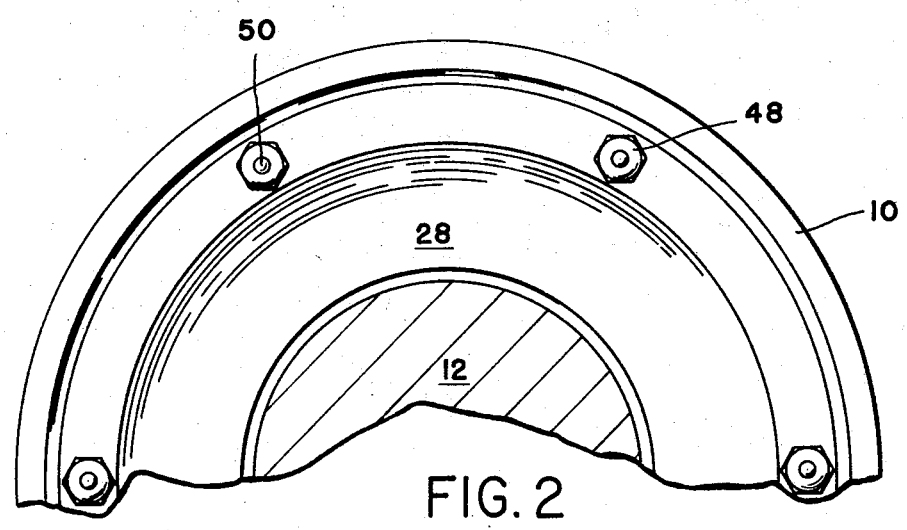

Referring to the drawing, numeral 10 designates a hub portion of an aircraft wheel rotatably mounted on a fixed axle 12 by means of an annular bearing 14 suitably mounted therebetween. The bearing 14 includes an annular outer race or cup 16 received by an annular recess formed in hub portion 10 and fixedly secured in position relative to the hub portion 10 by suitable means such as a shrink fit. An annular inner race or cone 18 is slidably received by axle 12 and fixedly secured in position abutting an annular shoulder 20 by suitable means including an axle nut, not shown, threadedly secured to axle 12. A plurality of roller bearings 22 suitably interposed in circumferentially spaced apart relationship between inner and outer races 18 and 16 permit outer race 16 to rotate about inner race 18.

The roller bearings 22 are normally packed in grease for lubrication purposes which grease must be retained and shielded from dirt or dust at all times by a suitable grease seal. To that end, the present invention provides an annular metal plate 24 having a radially outwardly extending flange 26 and a radially inwardly extending flange 28 connected by an integral axially extending rib portion 30. An annular flexible seal 32 of suitable elastomeric material having a lip portion 34 is fixedly secured to the rib portion 30 by any suitable means such as conventional molding or fastening techniques providing a satisfactory fluid seal therebetween. The lip portion 34 is adapted to slidably engage the surface of inner race or cone 18 which surface is relatively hard and highly polished thereby providing a desirable sealing surface.

The radially outwardly extending flange 26 is received by a mating annular recess 36 formed in hub portion 10. A plurality of circumferentially spaced apart studs 38 fixedly secured at one end to flange 26 as by welding extend therefrom through openings 40 in an annular flexible elastomeric member 42 and openings 44 in an annular metal backing member 46 which bears against flexible member 42. A nut 48 threadedly engaged with a threaded end portion 50 of each stud 38 is adapted to compress member 42 between flange 26 and backing member 46 thereby extruding backing member 46 radially outwardly into an annular concave recess 52 formed in hub portion 10 thereby securing metal plate 24 in position on hub portion 10. The nuts 48 may be tightened in sequence to a predetermined torque specification to ensure adequate frictional holding force and static seal between member 42 and recess 52.

The radially inwardly extending flange 28 extends inwardly of the radially outermost edge of inner race or cone 18 in axially spaced apart relationship thereto such that removal of the hub portion 10 from the axle 12 in the conventional manner results in engagement of flange 28 with inner race or cone 18 without disturbing the lip portion 34 from the mating surface of inner race or cone 18. As the hub portion 10 is withdrawn axially from axle 12 the flange 28 draws the inner race or cone 18 off axle 12 thereby maintaining lip portion 34 in sealing engagement with inner race or cone 18 which prevents loss of grease and/or contamination of the grease by dirt subsequent to removal of the wheel and attached bearing 14 from axle 12.

The spaced relationship between flange 28 and inner race or cone 18 is adequate to prevent frictional engagement between the rotating flange 28 and fixed inner race or cone 18 as well as minimize the required axial displacement of hub portion 10 to effect engagement of flange 28 with inner race or cone 18.

It will be recognized that the nuts 48 may be loosened to permit retraction of the elastomeric member 42 from recess 52 and removal of the plate 24 from hub portion 10 in the event replacement of the plate 24 and attached seal 32 is desired.

In summary, the advantages provided by applicants' above described seal relative to prior art seals such as disclosed in U.S. Pat. No. 3,362,452 include:

1. The bearing cavity once packed with grease is not exposed to contamination as by dust or dirt particles since the sealing surfaces are always in contact even in the event of disassembly of the wheel and supporting axle.

2. The dynamic seal or lip portion 34 slides on the hard and highly polished metal surface of the inner race or cone.

3. The seal is secured to a wheel hub without snap rings or the like which tend to produce undesirable stress concentration.

4. The seal is provided with an elastomeric member which retains the seal on a wheel hub and which provides a flexible static seal therebetween.

5. The seal structure including elastomeric member may be stored as an assembly thereby simplifying inventory of the same.

We claim:

1. A grease retaining and/or dirt excluding seal assembly for an annular wheel bearing having radially spaced apart cone and cup portions one of which is secured to a rotatable wheel and the other of which is secured to a fixed supporting axle, said seal assembly comprising:

an annular plate having oppositely extending first and second flange portions and an intermediate portion connecting the same;

fastening means including an annular elastomeric member bearing against said first flange portion and adjustable means operatively connected to said first flange portion for compressing said elastomeric member against said first flange portion to radially extrude said elastomeric member into engagement with said wheel to secure said annular plate in position on said wheel;

an annular flexible seal fixedly secured to said intermediate portion and extending therefrom into sliding and sealing engagement with said cone portion.

2. A grease retaining and/or dirt excluding seal assembly as claimed in claim 1, wherein:

said annular elastomeric member is interposed between said first flange portion and an annular backing member; and said fastening means includes a plurality of circumferentially spaced apart stud members fixedly secured at one end to said first flange portion and extending through said elastomeric member and said backing member and means threadedly engaged with the opposite ends of said stud members for urging said backing plate toward said first flange portion to compress said elastomeric member.

3. A grease retaining and/or dirt excluding seal assembly as claimed in claim 1, wherein:

said second flange portion extends into spaced apart axial relationship with said cone portion and is adapted to engage said cone portion to withdraw the same from said axle upon removal of said wheel from said axle thereby maintaining said annular flexible seal in sealing engagement with said cone portion.

4. A grease retaining and/or dirt excluding seal assembly as claimed in claim 1, and further including:

an annular depression formed in said wheel and adapted to receive the extruded portion of said elastomeric member to secure said annular plate in position axially relative to said wheel.

5. A grease retaining and/or dirt excluding seal assembly as claimed in claim 3, wherein:

said second flange portion is spaced apart axially relative to said cone portion to prevent contact between said rotatable second flange portion and said fixed cone portion.

6. A grease retaining and/or dirt excluding seal assembly as claimed in claim 1, wherein:

said first and second flange portions are parallel and in axially spaced apart relationship.

* * * * *